United States Patent
Kim

(10) Patent No.: US 6,381,084 B1
(45) Date of Patent: Apr. 30, 2002

(54) PREVENTING OVERRUN IN A DISK CONTROLLER BY USING TIMER INTERRUPTS FROM A MICROPROCESSOR TO HALT SEQUENCER

(75) Inventor: Hack-bin Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/635,170

(22) Filed: Apr. 25, 1996

(30) Foreign Application Priority Data

Apr. 25, 1995 (KR) .............................................. 95-9792

(51) Int. Cl.[7] .................................................. G11B 5/09
(52) U.S. Cl. .......................................... 360/51; 360/31
(58) Field of Search ........................ 360/48, 51, 77.02, 360/77.04, 77.08, 78.04, 78.13, 31; 395/182.02, 438; 369/32

(56) References Cited

U.S. PATENT DOCUMENTS

| | | | |
|---|---|---|---|
| 4,920,462 A | 4/1990 | Couse et al. | 360/78.04 |
| 5,060,093 A | 10/1991 | Kawahara | 360/78.13 |
| 5,371,724 A | 12/1994 | Uno | 369/32 |
| 5,517,631 A * | 5/1996 | Machado et al. | 360/77.02 X |

* cited by examiner

*Primary Examiner*—Regina Y. Neal
(74) *Attorney, Agent, or Firm*—Robert E. Bushnell, Esq.

(57) ABSTRACT

A sequencer overrun prevention method includes the steps of: initializing a sequencer; reading a timer value indicating when the sequencer begins operation; calculating a sequencer halting point by adding a predetermined time constant to the timer value; determining whether the sequencer operates at the sequencer halting point; and forcibly halting the sequencer when the sequencer operates at the sequencer halting point. The predetermined time constant is represented by T in the expression:

$$T = (N) \times (\text{time required for one disk revolution}) \times (\text{timer frequency}),$$

where N is indicative of a maximum number of detected indices and is greater than or equal to two. According to this method, the overhead time of a microprocessor can be reduced and sequencer overrun is prevented.

14 Claims, 5 Drawing Sheets

PREVENTING OVERRUN IN A DISK CONTROLLER BY USING TIMER INTERRUPTS FROM A MICROPROCESSOR TO HALT SEQUENCER

CLAIM OF PRIORITY

This application makes reference to, incorporates the same herein, and claims all benefits accruing under 35 U.S.C. § 119 arising from an application for Method For Preventing Overrun In A Disk Controller earlier filed in the Korean Industrial Property Office on Apr. 25, 1995 and there duly assigned Serial No. 9792/1995.

BACKGROUND OF THE INVENTION

The present invention relates to a disk controller, and more particularly, to a method for preventing an overrun condition of a sequencer in a disk controller.

When performing a read or write operation in a disk drive device, a disk controller determines the position of a transducing head along a disk surface by detecting predetermined information on the disk surface. When this information is not detected, perhaps due to a disk defect, an overrun condition can occur, thereby creating an obstacle to normal operation. Accordingly, there exists a need to prevent overrun conditions in a disk drive device.

One prior art reference directed towards solving this problem is U.S. Pat. No. 5,371,724 entitled Data Transducer positioning System With An Overrun Prevention Capability issued to Uno. In Uno '724, a track seeking operation is stopped when a predetermined number of errors are detected. An error is determined to have occurred when actual track data differs by a predetermined degree from an expected track on which the transducer is supposed to be positioned at that moment. While conventional art such as Uno '724 possesses merit in its own right, I believe that an improved method for preventing overruns in a disk controller can be contemplated.

SUMMARY OF THE INVENTION

Accordingly, it is an object of the present invention to provide an improved method for preventing an overrun condition in a disk controller.

It is another object to provide a method for effectively preventing an overrun condition of a sequencer in a disk controller by using timer interrupts from a microprocessor.

To achieve these and other objects, the present invention provides a sequencer overrun prevention method contemplates initializing a sequencer; reading a timer value indicating when the sequencer begins operation; calculating a sequencer halting point by adding a predetermined time constant to the timer value; determining whether the sequencer operates at the sequencer halting point; and forcibly halting the sequencer when the sequencer operates at the sequencer halting point. The predetermined time constant is represented by T in the expression: T=(N)×(time required for one disk revolution)×(timer frequency), where N is indicative of a maximum number of detected indices and is greater than or equal to two.

There is also provided a sequencer overrun prevention method, following one or more steps of calculating a sequencer halting point by adding a predetermined time constant to a timer value indicating when a sequencer begins operation; reading a current timer value during the operation of the sequencer; incrementing the current timer value by a predetermined value to generate an incremented timer value; determining whether the sequencer halting point is equal to the incremented timer value; and setting a flag representative of an index detection error, and forcibly halting the sequencer when the sequencer halting point is equal to the incremented timer value. The predetermined time constant is represented by T the in expression: T=(N)×(time required for one disk revolution)×(timer frequency), where N is indicative of a maximum number of detected indices and is greater than or equal to two. Other steps are provided for determining whether the flag representative of the index detection error is set; performing an index detection error correction routine when the flag is set; and performing a normal error detection and correction routine when the flag is cleared.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE INVENTION

Figure 1:
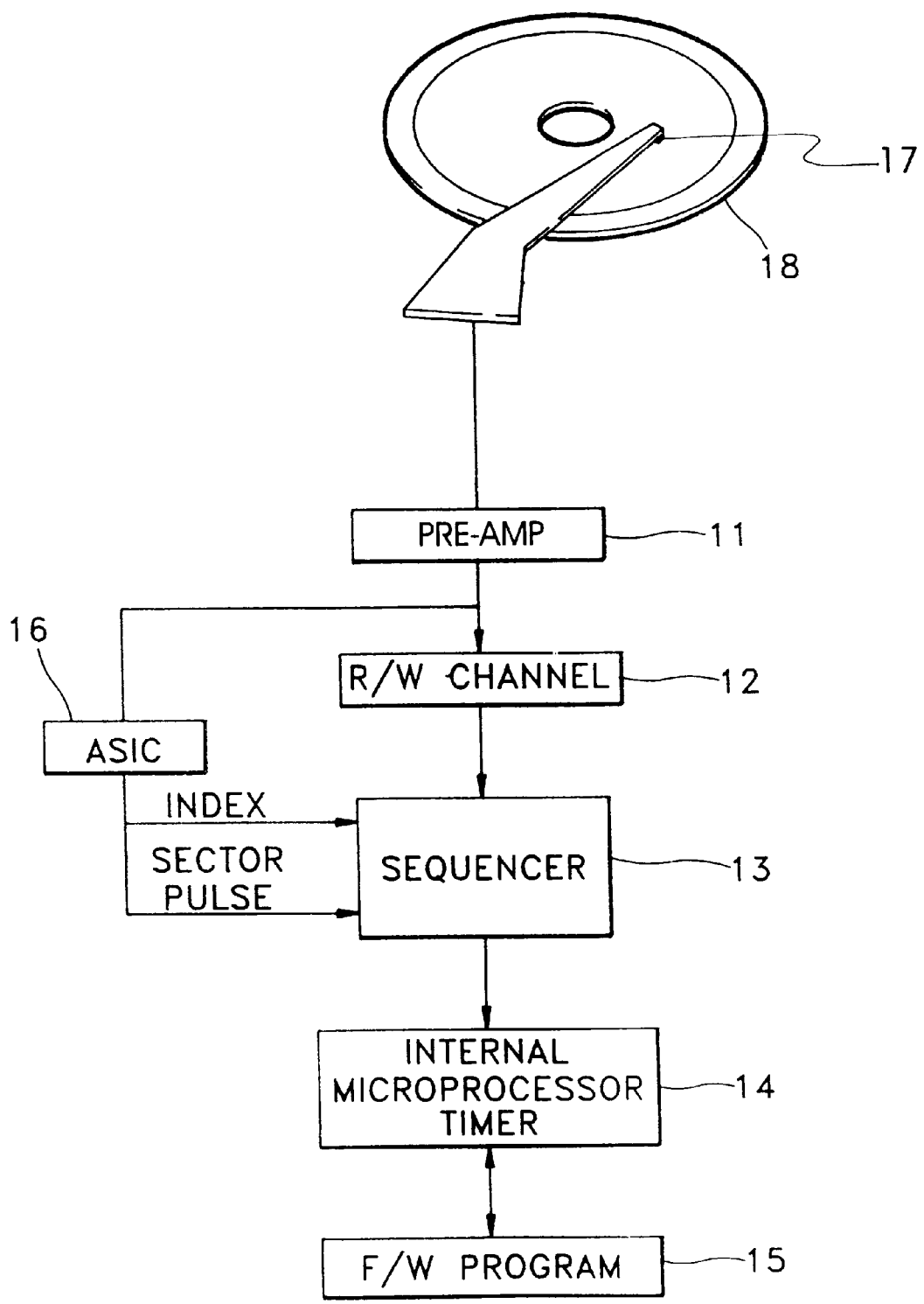
FIG. 1 is a schematic block diagram of the hardware of a general hard disk controller.

Turning now to the drawings and referring to FIG. 1, a schematic block diagram of the hardware in a general hard disk controller is shown. In the hard disk controller of FIG. 1, a pre-amp 11 is a circuit for amplifying a signal read by a head 17 from a disk 18. A read/write (R/W) channel 12 qualifies the waveform of the signal output from pre-amp 11, and converts the qualified signal into digital data. An application-specific integrated circuit (ASIC) 16 is a burst timing generating circuit for producing position error signal (PES) information, and is comprised of collective logic arrays for generating various control signals from the signal received from head 17. A sequencer 13 is a circuit for both controlling the rotational speed of disk 18, and storing data read from disk 18 in a buffer (not shown). An internal microprocessor timer 14 provides basic time information needed for driving disk 18. A firm ware (F/W) program 15 is stored in a programmable read-only memory (PROM), to control the overall operation of the hard disk controller.

An information recording area on disk 18 may be constructed with a servo sector for providing a reference signal to determine the vertical and horizontal locations of head 17, and data sectors where data is read from and written to under the control of the hard disk controller. Indices are recorded in the servo sector to determine reference positions in the circumferential direction of disk 18. Hence, the determination of a position on disk 18 in the circumferential direction is based on the indices.

Within each data sector, continuous data streams are recorded in predetermined unit lengths, which are referred to as fields. A field pulse is generated to indicate the start of a given field. Each data sector includes a gap between sectors, an identification (ID) field, and a data field. The identification (ID) field includes: an identification (ID) address mark, an identification (ID) phase locked oscillation (PLO), identification (ID) position information, identification (ID) split information, and an identification (ID) cyclic redundancy code (CRC). The data field includes: a data phase locked oscillation (PLO), a data address mark, data, and a data error correction code (ECC).

To read and write data from and to disk 18, the hard disk controller of FIG. 1 typically: (1) detects a field pulse; (2) detects an identification (ID) address mark; and (3) reads identification (ID) position information and identification (ID) split information and verifies whether an identification (ID) cyclic redundancy code (CRC) value is correct. This operation is necessary to successfully read data from an intended data sector. When an error is detected while performing steps (2) and (3) due to a disk defect, sequencer 13 waits for the next field pulse. If the disk has a permanent defect, sequencer 13 repeats its actions without stopping. That is, sequencer 13 overruns itself.

Figure 2:
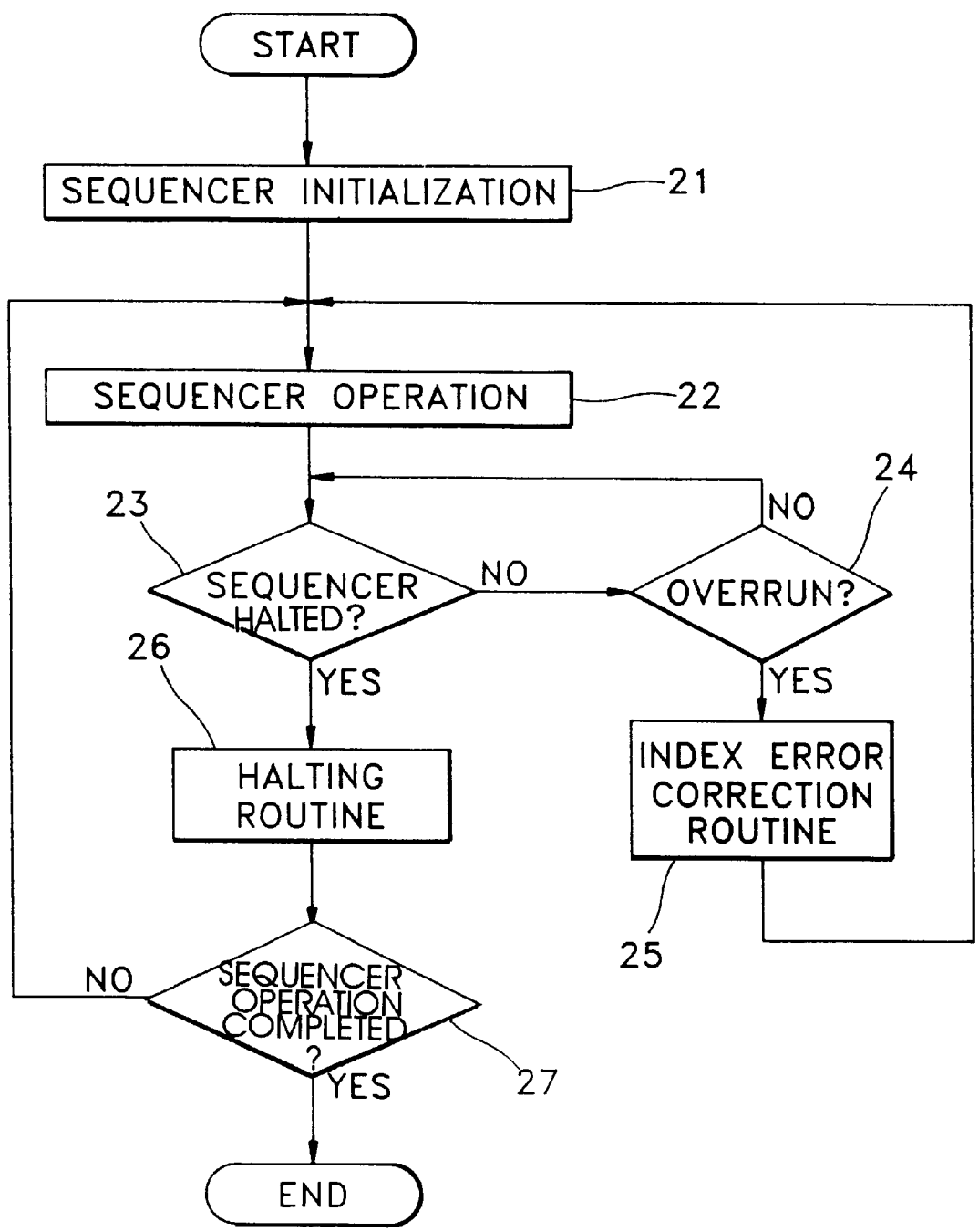
FIG. 2 is a flow chart of a general sequencer overrun prevention method.

To prevent an overrun, sequencer 13 typically operates as shown in the flow chart of FIG. 2. According to FIG. 2, sequencer 13 is initialized in step 21, and operates in step 22. A predetermined time period after head 17 starts to seek a specific position on disk 18, a determination is made as to whether sequencer 13 is in a halted state, in step 23. When sequencer 13 is in a halted state, which implies that head 17 has normally moved and sought a position on disk 18, sequencer 13 remains in a halted state pursuant to execution of a halting routine, in step 26. Then, in step 27, a determination is made as to whether sequencer 13 has completely halted to thereby complete its operation. If sequencer 13 has completed its operation, the operation of preventing a sequencer overrun is finished. On the contrary, if sequencer 13 has not completed its operation, which indicates that sequencer 13 is not being controlled in a normal manner, the procedure loops back to step 22. If sequencer 13 is not in a halted state in step 23, a determination is made as to whether sequencer 13 is in an overrun condition, in step 24. When sequencer 13 is not in an overrun condition, which implies that head 17 is normally seeking a position on disk 18, it is again determined whether sequencer 13 is in a halted state, in step 23. When sequencer 13 is in an overrun condition, which implies that an index signal is not detected (i.e., an index error is detected), an index error correction routine is performed in step 25, and the procedure loops back to step 22.

Conventionally, to prevent an overrun, the number of detected indices is counted by microprocessor timer 14 in step 24. If a predetermined number of indices are detected, sequencer 13 stops operating. That is, if specific identification (ID) data is not detected even after disk 18 has been rotated several times, sequencer 13 should be halted to correct the error. In cases where an error is found in an index signal, however, sequencer 13 is placed in an overrun condition, which is an obstacle to normal operation. Therefore, to prevent this problem, sequencer 13 should be forcibly halted a predetermined time later.

A method for preventing an overrun of sequencer 13 in a disk controller by using timer interrupts according to the principles of the present invention will now be described with reference to the attached drawings.

Figure 3:
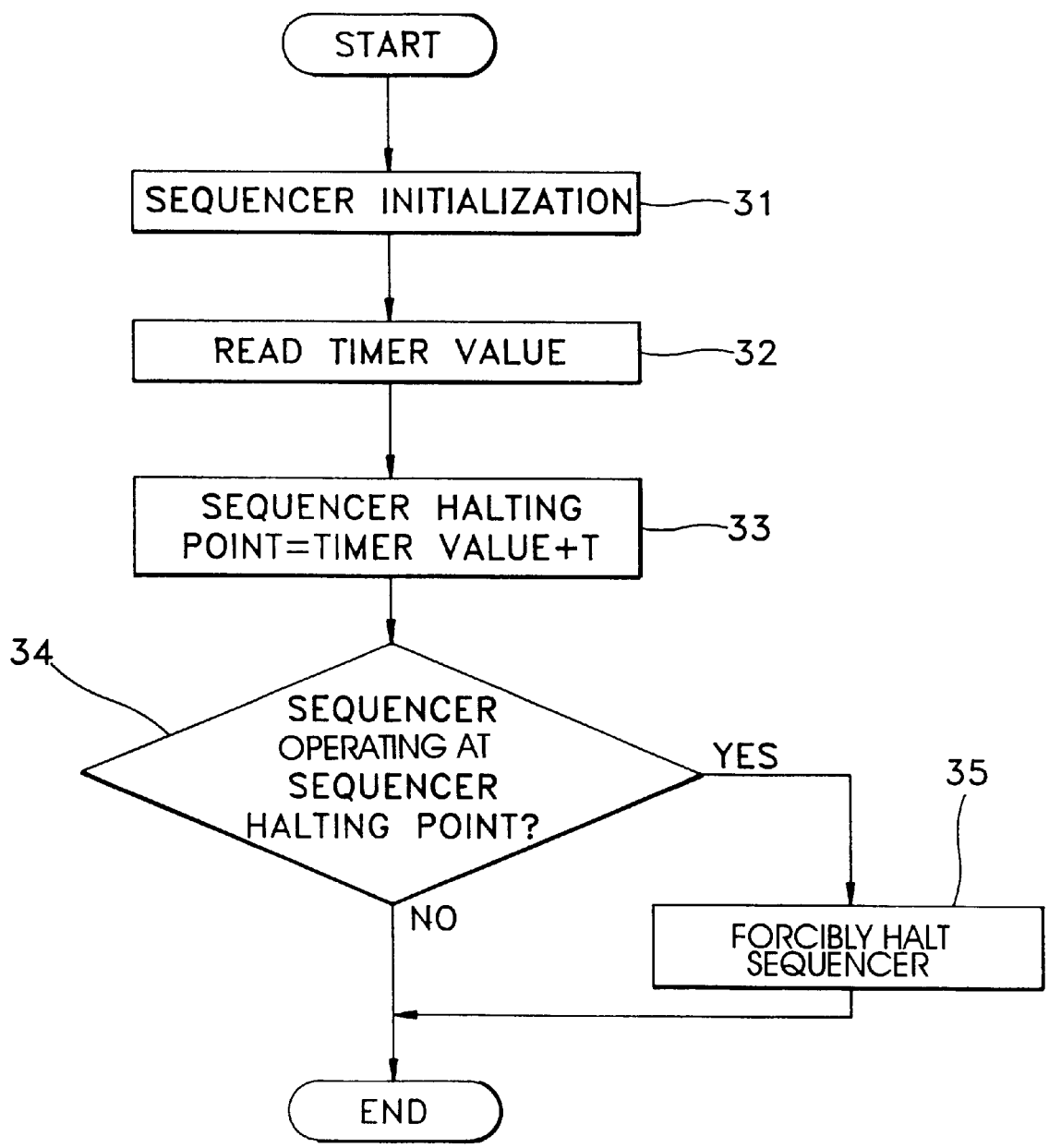
FIG. 3 is a flow chart of a sequencer overrun prevention routine performed at the start of a sequencer operation, in a sequencer overrun prevention method according to the principles of the present invention.

Referring to FIG. 3, an algorithm for preventing a sequencer overrun by using timer interrupts at the start of a sequencer operation will be described.

In step 31, sequencer 13 is initialized, and a timer value indicating when sequencer 13 starts to operate is read in step 32. Then, the read timer value is added to a predetermined time constant T to thereby calculate a halting point of sequencer 13, in step 33. The sequencer halting point indicates the maximum allowable time for continuous operation of sequencer 13 in a normal state.

If sequencer 13 operates past the halting point, it is considered to be in an overrun condition. In consideration of the rotational speed of disk 18, the predetermined time constant T for calculating the sequencer halting point is given by the following equation:

$$T=(N)\times(\text{time required for one disk revolution})\times(\text{timer frequency}) \quad (1)$$

where N is an integer greater than or equal to 2. N is indicative of the maximum number of detected indices. For example, assume that N=3, the rotational speed of disk 18 is 5400 RPM (i.e., the time required for one revolution of disk 18 is 11.111 milliseconds), and the timer frequency is 1 KHz. Accordingly, the predetermined time constant T is calculated as follows:

$$T=3\times11.111\times1=33.333 \text{ (ticks)} \quad (2)$$

Therefore, an integer greater than or equal to 34 is used as the predetermined time constant T. After the sequencer halting point is calculated in step 33, as described above, a determination is made as to whether sequencer 13 is operating at the halting point, in step 34. If sequencer 13 is operating at the sequencer halting point, sequencer 13 is considered to be in an overrun condition and is forcibly halted, in step 35.

Figure 4:
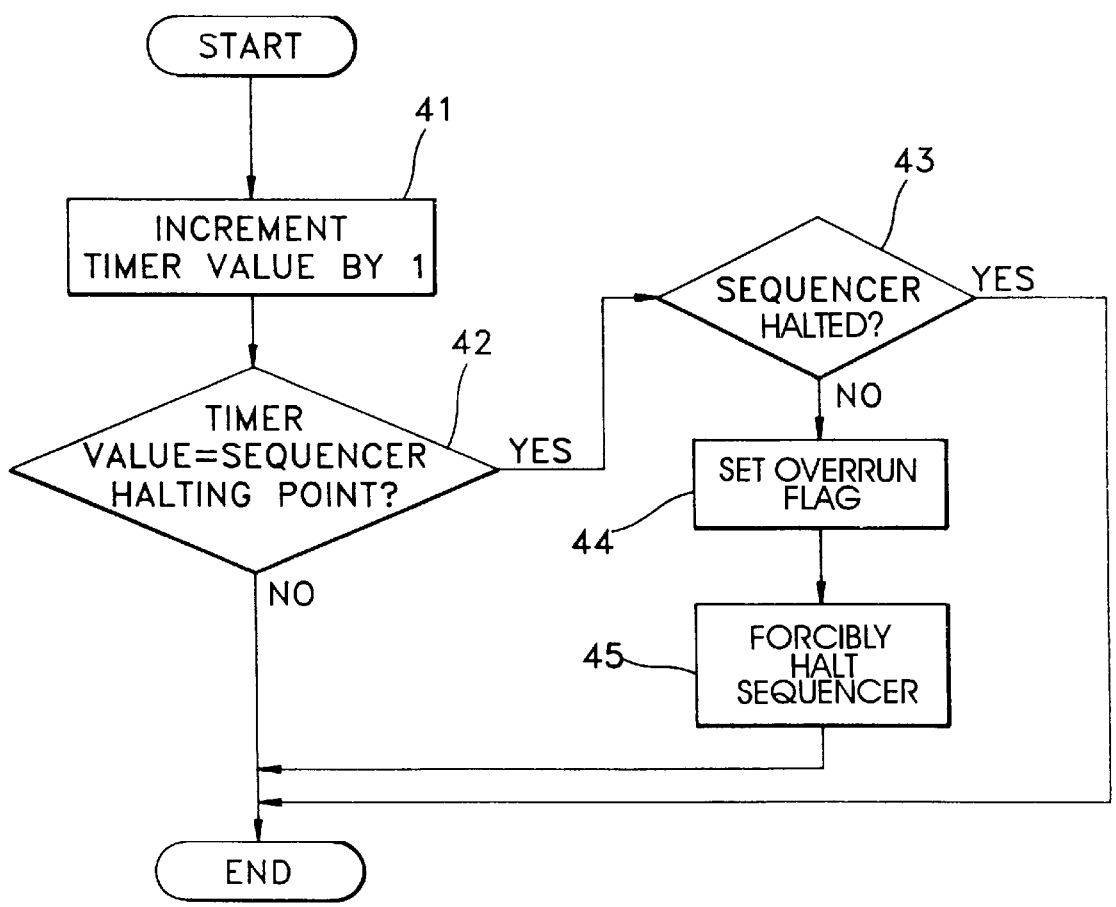
FIG. 4 is a flow chart of a timer overflow interrupt service routine in the sequencer overrun prevention method of the present invention.

Referring to FIG. 4, an algorithm for preventing a sequencer overrun by using a timer interrupt service routine will now be described.

In step 41, a timer value is read and incremented by one. Then, to determine whether a sequencer overrun condition exists, the sequencer halting point calculated in step 33 is compared with the timer value, in step 42. If the timer value is different from the sequencer halting point, the timer interrupt service routine ends. When the timer value is equal to the sequencer halting point in step 42, a determination is made as to whether sequencer 13 is in a halted state, in step 43. If sequencer 13 is in a halted state, the timer interrupt service routine ends.

If sequencer 13 is not in a halted state in step 43, sequencer 13 is considered to be in an overrun condition due to an index detection error. Thus, a flag indicative of the index detection error is set in step 44, and sequencer 13 is forcibly halted in step 45. Here, the timer interrupt service routine is implemented by generating timer overflow interrupts in internal microprocessor timer 14 of FIG. 1.

Figure 5:
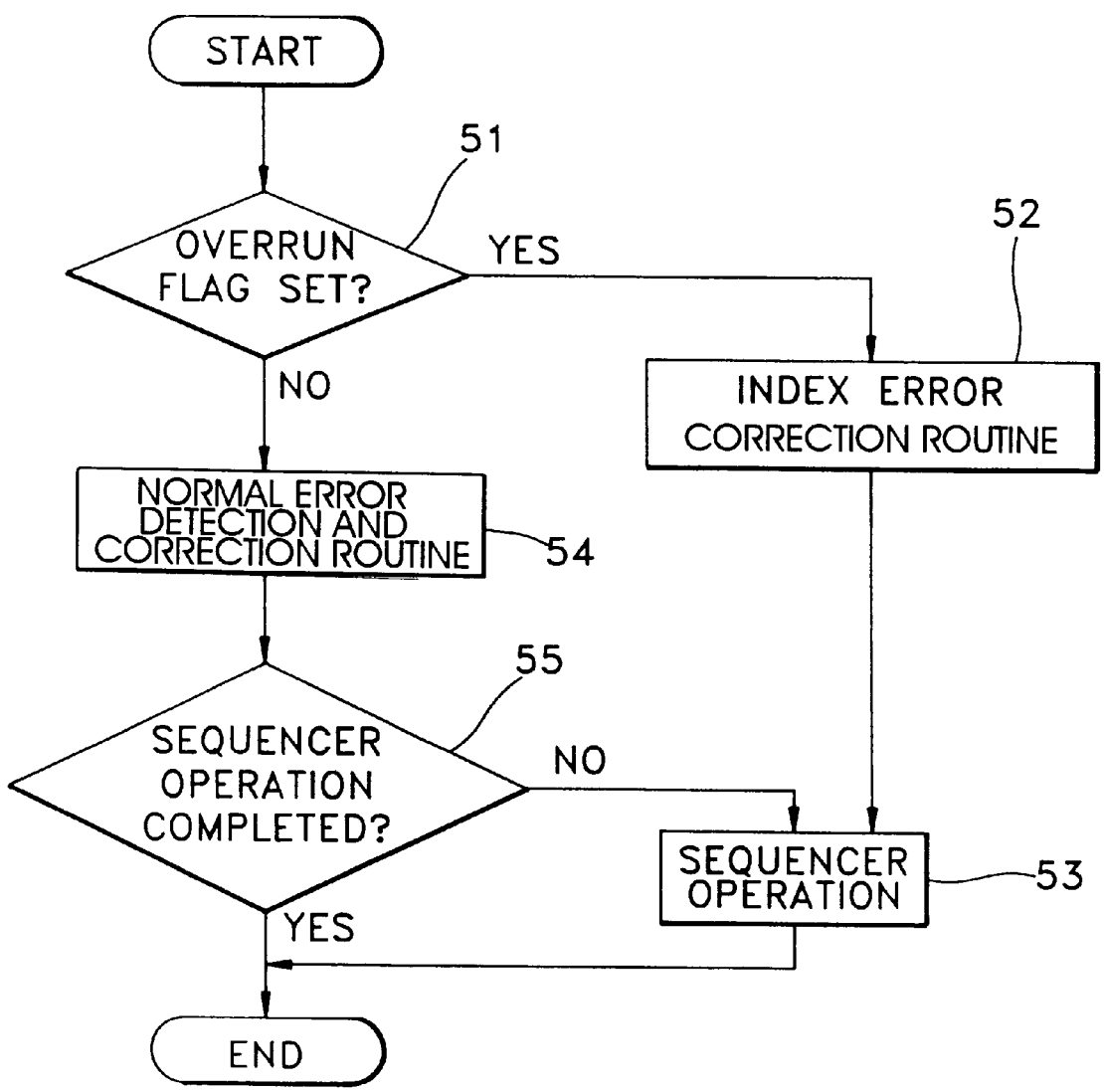
FIG. 5 is a flow chart of a disk interrupt service routine performed when the sequencer is in a halted state, in the sequencer overrun prevention method of the present invention.

Referring to FIG. 5, a disk interrupt service routine when sequencer 13 is in a halted state will now be described.

In step 51, a determination is made as to whether the overrun flag indicative of an index detection error is set. If the overrun flag is set, which indicates that sequencer 13 is in a halted state due to an overrun, an index detection error correction routine is performed in step 52, and then sequencer 13 is operated in step 53. If, in step 51, the overrun flag indicative of an index detection error is cleared, which indicates that sequencer 13 is in a halted state without an overrun, a normal error detection and correction routine is performed in step 54. Hence, the overhead time of a microprocessor caused by polling can be reduced by using interrupts generated by internal (or external) microprocessor timer 14. In step 55, a determination is made as to whether sequencer operation is complete. If sequencer operation is complete, the procedure is terminated; otherwise, sequencer 13 continues to operate in step 53.

In the method of FIG. 2, a polling loop is repeatedly performed so that the microprocessor can detect the state of the sequencer. This method, however, lacks efficiency since it fails to optimally utilize the operational capabilities of the microprocessor. The sequencer overrun prevention method of the present invention, on the other hand, prevents a sequencer overrun by using interrupts from a microprocessor timer. Therefore, sequencer overruns are prevented at the start of, and in the process of sequencer operation, so that errors are efficiently corrected when the sequencer is in a halted state.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but the present invention includes all embodiments falling withing the scope of the appended claims.

What is claimed is:

1. A sequencer overrun prevention method, comprising the steps of:
    initializing a sequencer;
    reading a timer value indicating when said sequencer begins operation;
    calculating a sequencer halting point by adding a predetermined time constant to said timer value;
    determining whether said sequencer operates at said sequencer halting point; and
    forcibly halting said sequencer when said sequencer operates at said sequencer halting point.

2. The method as claimed in claim 1, wherein said predetermined time constant is represented by T in a following expression:

$$T=(N)\times(\text{time required for one disk revolution})\times(\text{timer frequency}),$$

where N is indicative of a maximum number of detected indices and is greater than or equal to two.

3. A sequencer overrun prevention method, comprising the steps of:
    calculating a sequencer halting point by adding a predetermined time constant to a timer value indicating when a sequencer begins operation;
    reading a current timer value during the operation of said sequencer;
    incrementing said current timer value by a predetermined value to generate an incremented timer value;
    determining whether said sequencer halting point is equal to said incremented timer value; and
    setting a flag representative of an index detection error, and forcibly halting said sequencer when said sequencer halting point is equal to said incremented timer value.

4. The method as claimed in claim 3, wherein said predetermined time constant is represented by T in a following expression:

$$T=(N)\times(\text{time required for one disk revolution})\times(\text{timer frequency}),$$

where N is indicative of a maximum number of detected indices and is greater than or equal to two.

5. The method as claimed in claim 3, wherein said predetermined value is equal to one.

6. The method as claimed in claim 4, wherein said predetermined value is equal to one.

7. The method as claimed in claim 3, further comprising steps of:
    determining whether said flag representative of said index detection error is set;
    performing an index detection error correction routine when said flag is set; and
    performing a normal error detection and correction routine when said flag is cleared.

8. The method as claimed in claim 6, further comprising steps of:
    determining whether said flag representative of said index detection error is set;
    performing an index detection error correction routine when said flag is set; and
    performing a normal error detection and correction routine when said flag is cleared.

9. A sequencer overrun prevention method, comprising the steps of:
    initializing a sequencer;
    reading an initial timer value indicating when said sequencer begins operation;
    calculating a sequencer halting point by adding a predetermined time constant to said initial timer value;
    reading a current timer value during the operation of said sequencer;
    incrementing said current timer value by a predetermined value to generate an incremented timer value;
    determining whether said sequencer halting point is equal to said incremented timer value; and
    setting a flag representative of an index detection error, and forcibly halting said sequencer when said sequencer halting point is equal to said incremented timer value.

10. The method as claimed in claim 9, wherein said predetermined time constant is represented by T in a following expression:

$$T=(N)\times(\text{time required for one disk revolution})\times(\text{timer frequency}),$$

where N is indicative of a maximum number of detected indices and is greater than or equal to two.

11. The method as claimed in claim 9, wherein said predetermined value is equal to one.

12. The method as claimed in claim 10, wherein said predetermined value is equal to one.

13. The method as claimed in claim 10, further comprising steps of:
    determining whether said flag representative of said index detection error is set;
    performing an index detection error correction routine when said flag is set; and
    performing a normal error detection and correction routine when said flag is cleared.

14. The method as claimed in claim 12, further comprising steps of:
    determining whether said flag representative of said index detection error is set;
    performing an index detection error correction routine when said flag is set; and
    performing a normal error detection and correction routine when said flag is cleared.

* * * * *

UNITED STATES PATENT AND TRADEMARK OFFICE
CERTIFICATE OF CORRECTION

PATENT NO. : 6,381,084 B1
DATED : April 30, 2002
INVENTOR(S) : Kim

It is certified that error appears in the above-identified patent and that said Letters Patent is hereby corrected as shown below:

Title page,
Item [*] Notice, delete "0" and insert -- 948 --.

Signed and Sealed this

Twenty-eighth Day of September, 2004

JON W. DUDAS
*Director of the United States Patent and Trademark Office*